Aug. 31, 1937.   I. H. BETTIS   2,091,906
TOOL JOINT
Filed July 5, 1935
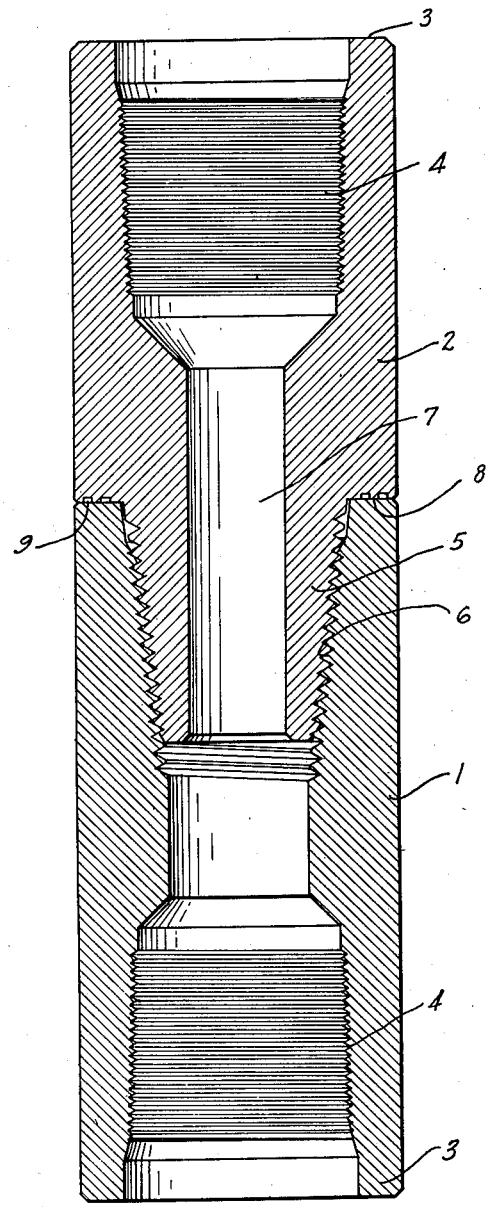
Irvin H. Bettis
INVENTOR
BY Jesse R. Stone
ATTORNEY Patented Aug. 31, 1937

2,091,906

UNITED STATES PATENT OFFICE 2,091,906

TOOL JOINT

Irvin H. Bettis, Oklahoma City, Okla., assignor to Hughes Tool Company, Houston, Tex., a corporation of Texas Application July 5, 1935, Serial No. 29,902

1 Claim. (Cl. 285—146)

My invention relates to tool joints employed in connecting together sections of drill stem in deep well drilling.

In the use of tool joints in drilling wells, drilling fluid is pumped downwardly through the stem under high pressures, and difficulty is experienced in maintaining the connection at the joint against leakage. It is found that a small leak may develop around the threads and if the escape of the fluid at the shoulder of the joint is not prevented, the tool joint will soon become badly worn and useless.

Further, when the tool joint sections are screwed tightly together in an effort to maintain a seal, the metal upon the threads and upon the shoulder of the joint is liable to gall. Small slivers of steel are rolled up along the contacting surfaces due to friction and a tight seal is thereafter difficult.

It is an object of the present invention to provide a tool joint, constructed to provide an efficient seal at the shoulder thereof.

I aim to provide grooves in the adjacent faces of the tool joint sections into which galled metal may be forced.

I also desire to prevent the gall, if formed, from extending to the entire sealing area and thus destroying the seal.

In the drawing is shown a central longitudinal section through a tool joint embodying the invention.

The joint is made up of a box section 1 and a pin section 2, both of which are threaded at the pipe end 3 with a socket 4 finely threaded to connect with the end of a pipe section.

The pin member has a pin 5 tapered and threaded with a coarse hardened thread to engage in the threaded box 6 of the box member. The longitudinal fluid passage 7 through the pin section is made as large as is possible considering the strength of the joint.

At the base of the pin 5 is a shoulder 8 upon the pin section against which the end of the box section contacts when the joint is screwed up tightly. Reliance is placed upon the preserving of a seal at this shoulder, for the reason that some leakage about the threads of the connection is liable to occur due to the flexing and wabbling of the joint during the rotation of the drill stem. When the shoulder and box end engage frictionally in tightening up the joint galling of the metal may occur resulting in the rolling up of small lumps of metal which interferes with the preserving of the seal.

To avoid this galling to some extent, and also to prevent the forming of such lumps on the sealing area, I contemplate forming one or more annular grooves 9 in the shoulder 8. Said grooves are deep enough to allow space into which any galled metal which may be formed may be forced, thus preventing the formation of lumps of metal on the sealing surface. Further, where galling is started upon this shoulder it tends to spread and these grooves limit the area to which it may extend. The grooves may be filled with a heavy grease and thus assist, by the feeding of lubricant to the shoulder area, in preserving a seal, in addition to the resistance which it has to galling by lessening of friction.

It is also to be noted that as the frictional area at the shoulder is lessened in extent, a close seal may be obtained without the necessity of so hard a frictional contact.

The effect of these grooves is, therefore, to lessen the amount of galling, decrease friction, and to prevent the forming of lumps of galled metal of so great an extent as to prevent the forming of a seal at the shoulder.

What I claim as new is:

In a tubular fluid conducting tool joint for drill stems, a pin section and a box section, a tapered pin on said pin section threaded to engage a tapered box in said box section, a shoulder on said pin section adjacent said pin, and a plurality of annular concentric grooves in said shoulder spaced from the edges thereof to reduce the frictional surface thereof.

IRVIN H. BETTIS.